United States Patent
Porter et al.

(10) Patent No.: US 6,693,279 B2
(45) Date of Patent: Feb. 17, 2004

(54) DYNAMIC OFFSET CORRECTION IN DETECTOR ARRAYS

(75) Inventors: Stephen George Porter, Towcester (GB); Graham Robert Jones, Northampton (GB); David Harry Broughton, Camberley (GB); John Fox, Kislingbury (GB); Bhajan Singh, Birmingham (GB)

(73) Assignee: InfraRed Integrated Systems Limited, Towcester (GB)

( * ) Notice: Subject to any disclaimer, the term of this patent is extended or adjusted under 35 U.S.C. 154(b) by 0 days.

(21) Appl. No.: 10/022,966

(22) Filed: Dec. 13, 2001

(65) Prior Publication Data

US 2002/0179838 A1 Dec. 5, 2002

(30) Foreign Application Priority Data

Dec. 13, 2000 (GB) .............................. 0030406

(51) Int. Cl.[7] .................................. G01J 5/02
(52) U.S. Cl. ................................. 250/338.3
(58) Field of Search .................. 250/338.1, 338.3, 250/338.4

(56) References Cited

U.S. PATENT DOCUMENTS

| | | | | |
|---|---|---|---|---|
| 4,633,223 A | * | 12/1986 | Senderowicz | 341/118 |
| 5,506,853 A | * | 4/1996 | Tegge | 372/29.011 |
| 5,654,755 A | * | 8/1997 | Hosier | 348/245 |
| 6,274,869 B1 | * | 8/2001 | Butler | 250/338.1 |
| 6,307,200 B1 | * | 10/2001 | Kuhnly et al. | 250/338.1 |
| 6,414,310 B1 | * | 7/2002 | Smith | 250/338.1 |
| 6,420,983 B1 | * | 7/2002 | Feygin et al. | 341/118 |
| 6,459,078 B1 | * | 10/2002 | Fowler | 250/214 A |
| 6,531,907 B2 | * | 3/2003 | Dooley et al. | 327/307 |

OTHER PUBLICATIONS

U.S. patent application Ser. No. 09/558,279, Hollock et al., filed Apr. 25, 2000.
U.S. patent application Ser. No. 09/579,636, Galloway et al., filed May 26, 2000.
U.S. patent application Ser. No. 09/643,099, Galloway, filed Aug. 21, 2000.
U.S. patent application Ser. No. 09/805,091, Galloway, filed Mar. 13, 2001.
U.S. patent application Ser. No. 09/826,126, Carter et al., filed Apr. 4, 2001.
U.S. patent application Ser. No. 09/912,242, Galloway, filed Jul. 23, 2001.
U.S. patent application Ser. No. 10/005,883, Whatmore, filed Dec. 3, 2001.

* cited by examiner

Primary Examiner—G. Bradley Bennett
(74) Attorney, Agent, or Firm—Moser, Patterson & Sheridan, L.L.P.

(57) ABSTRACT

A signal processing technique applied to the readout of two-dimensional detector arrays provides a dynamic correction mechanism for the varying offsets of the different elements of the array. The outputs of the elements are supplied to an offset correction circuit operative to compensate for the differences in the d.c. or low frequency outputs from a predetermined voltage wherein a fraction of the difference is subtracted at each successive cycle to gradually reduce the difference.

7 Claims, 3 Drawing Sheets

DYNAMIC OFFSET CORRECTION IN DETECTOR ARRAYS

BACKGROUND OF THE INVENTION

Field of the Invention

The present invention relates to a signal processing technique, applied to the readout of an array of detector elements, which corrects for the various offsets of the different elements of the arrays.

Two dimensional detector arrays are commonly used in conjunction with suitable optical systems to generate an image of a scene. The output from such an array is normally in the form of a multiplexed stream of analogue data and it is frequently the case that the desired output signal voltage for each element is superimposed on a larger offset voltage. There may also be responsivity and gain variations from element to element. It is therefore necessary to provide signal processing algorithms which correct for the different offset and gain characteristics of the different elements of the detector arrays. This is typically done by means of an electrical memory or storage mechanism which records fixed offset and gain correction parameters for each of the elements. These parameters are then read out sequentially in synchronism with the addressing of the elements of the array so that appropriate correction parameters may be applied to each element in turn. In certain types of detector array the offset voltages of the various elements are not fixed but vary with time so that this correction technique is inadequate. It would therefore be advantageous to provide a correction mechanism which would take account of time varying offsets.

SUMMARY OF THE INVENTION

The present invention provides a sensor comprising an array of detector elements and readout means for deriving from each of the elements a voltage signal relating to a detected phenomenon, the sensor having offset correction means operative to compensate for the difference between the mean output voltage derived from each element and a predetermined voltage, wherein the voltage signals are applied as input voltages to the offset correction means and for each element the offset correction means produces an output voltage that is derived from the input voltage and is continuously modified by subtracting from the input voltage a correcting voltage that is derived from an ongoing cumulative addition of a proportion of the difference between the output voltage for the said element and the predetermined voltage. If the proportion is kept constant for every cycle of the correction process, the difference between the output voltage and the predetermined voltage decays exponentially so that the output voltage approaches the predetermined voltage. The invention thus allows the reduction or removal of d.c. or low frequency offset voltages from higher frequency signal voltages. The invention also allows gain to be added to the signal chain in such a way as to amplify the desired signal while decreasing the unwanted offset voltages. The invention is particularly suitable for arrays of infrared detector elements. The elements are preferably pyroelectric detector elements.

In most applications the predetermined voltage will be the same for all elements but this need not necessarily be the case.

The invention also provides a method of processing detector array signals to compensate for differing offsets.

Usually the voltage signals from the detector elements are multiplexed whereby the voltage signals for different elements are processed in turn and the process is continuously repeated for all of the elements in turn.

The preferred embodiment of the invention is a digital system and as a result the decay of the difference between the output voltage and the predetermined voltage is only an approximation to an exponential decay. Thus, in the preferred embodiment of the invention, the offset correction means receives analogue signals from the readout means and includes an amplifier for providing output voltages, an analogue to digital converter for converting these output voltages to digital signals, a storage device for storing a number corresponding to each detector element, and a digital to analogue converter. The numbers in the storage device are incremented or decremented in proportion to the positive or negative difference between the output voltage and the predetermined voltage for the corresponding detector element. A proportion of each stored number is converted to an analogue value in the digital to analogue converter, and used to provide a correcting input voltage to the amplifier. It should be clear from the foregoing that the readout is now taken from the output of the offset correction means rather than directly from the detector elements.

An embodiment of the invention will now be described by way of example only and with reference to the accompanying drawings in which:

DETAILED DESCRIPTION OF THE PREFERRED EMBODIMENT

Figure 1:
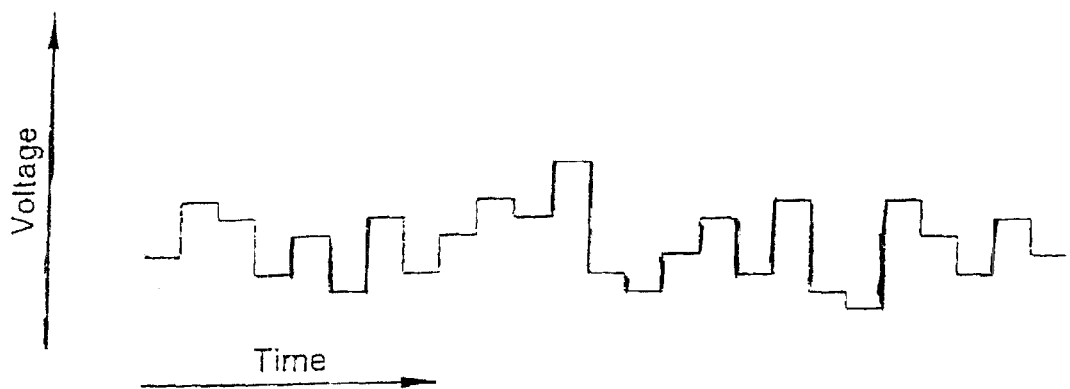
FIG. 1 is a schematic representation of the multiplexed output from 25 consecutive elements of a detector array with random offset levels.

FIG. 1 shows a schematic representation of the multiplexed output from 25 consecutive elements of a detector array with random offset levels. Commonly, the desired signal from each element is superimposed on the offset voltage for that element and is of much lower magnitude than the offset voltage. This makes it difficult to process the signals without removing or reducing the offsets first.

Figure 2:
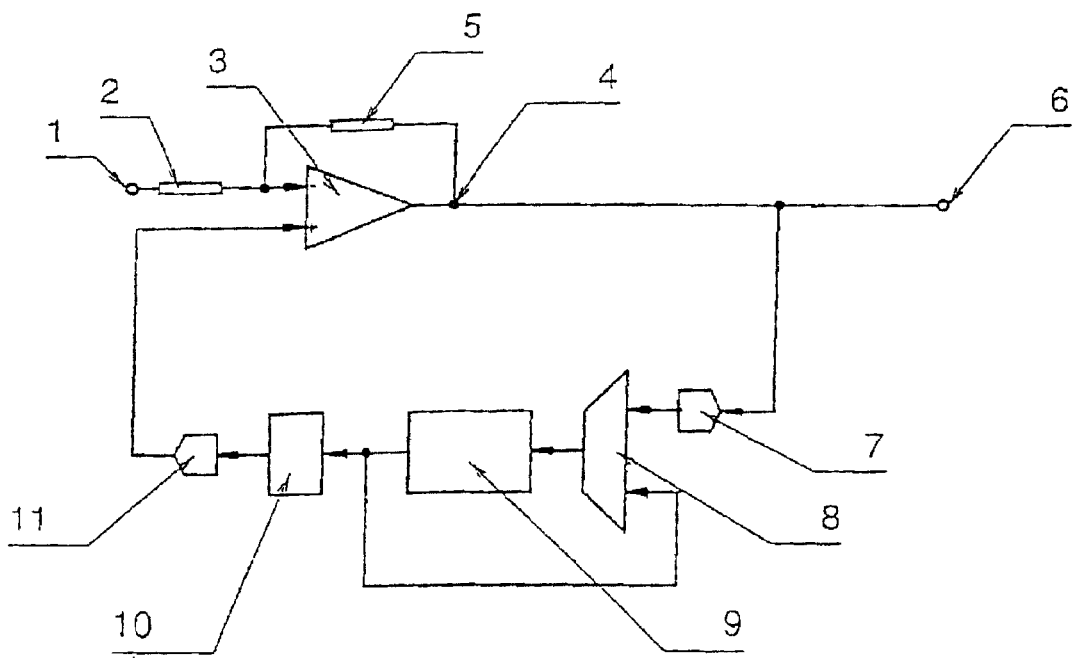
FIG. 2 is a schematic Circuit diagram for a form of offset correction means used in the preferred embodiment of the invention.

In this embodiment of the present invention, the output from the array is fed into the circuit shown schematically in FIG. 2. The multiplexed analogue output from the array is fed to the input point 1 and through resistor 2 into the inverting input of an operational amplifier 3. An inverted signal appears at the output 4 whose amplitude is determined by the ratio of the resistors 2 and 5. This amplified output is fed to both the output 6 of the circuit and the input of an analogue to digital converter (ADC) 7. The output from the ADC is arranged to be in offset binary format, so that deviations from the centre point of the operating analogue voltage range of the ADC are designated as positive or negative as appropriate, thus defining this centre point as the predetermined voltage. This ADC output is fed via an adder 8 into a storage device 9 which stores a number associated with each element of the array. The output from the storage device represents the previously stored value for a given element and is read out in synchronism with its new value being read in so that by means of the adder 8 the new value is the sum of the new value from the ADC 7 and the old value from the storage device. Thus, with each successive cycle through the elements, if the offset for a given element is constant, the number corresponding to that element is increased.

Figure 3:
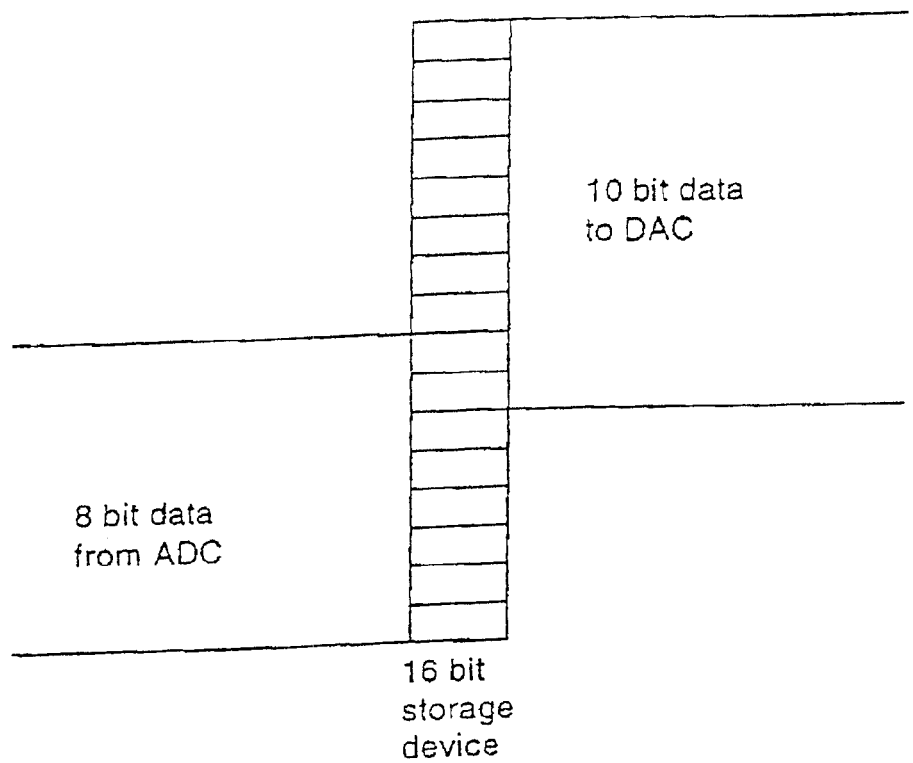
FIG. 3 is a schematic representation of a storage device suitable for the circuit of FIG. 2.

The output from the storage device 9 is also fed, via an inverter 10, to a digital to analogue converter (DAC) II. The resulting analogue signal is applied to the non-inverting input of the operational amplifier 3 and is thus subtracted from the input signal applied to the inverting input. The relative magnitudes of the analogue input voltage to the ADC 7 and the analogue output voltage from the DAC 11 are determined by the arrangement of the adder, the storage device, and the inverter. FIG. 3 is a representation of one possible arrangement of the storage device 9. In this example the storage device has 16 storage registers and 8 bit data from the ADC is read via the adder 8 into the least significant 8 registers of the storage device 9. The output to the DAC in the form of 10 bit data is read out from the most significant 10 registers. If both the ADC and the DAC are set so that their least significant bit represents 1 mV, then an input to the storage device of 64 mV from the ADC is required to produce an output of 1 mV from the DAC.

Figure 4:
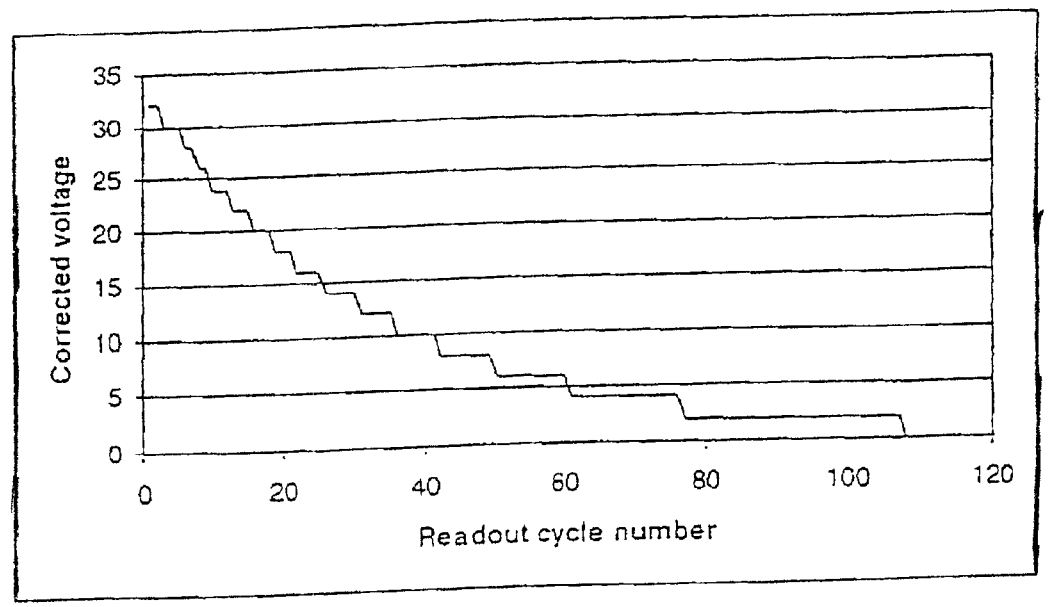
FIG. 4 is a graph showing the variation of offset voltage over time for one element of a detector array corrected using the present invention.

If, for example, the output from the amplifier 3 corresponding to a particular, element is 128 mV, then the output from the DAC 11 applied to the non-inverting input to the amplifier 3 will be 2 mV after the first complete read cycle of the array. If the resistors 2 and 5 are of equal value so that the gain of the operational amplifier 3 is unity (but inverting) for input signals applied to point 1, then the gain for signals from the DAC will be 2. Thus, on the second cycle, the output from the amplifier 3 will be reduced by 4 mV to 124 mV. The value corresponding to 124 mV will be added to that already stored in the storage device generating a number corresponding to 252 mV on the input side and 4 mV at the output from the DAC. On the next cycle, therefore, the amplifier output will be reduced to 120 mV and the process will continue with a gradually reducing output voltage being generated for the given element. When the output voltage is reduced to 2 mV, 32 cycles will be required before any further correction is made and when the input to the ADC is less than its least significant bit of 1 mV, correction will stop altogether. The annexed table illustrates how the digitised DAC output changes from 0 to 16, thereby reducing an initial output voltage from 32 mV to 0 mV over 107 cycles. This is illustrated in FIG. 4.

The exponential decay of the output voltage has a time constant associated with it, which is determined by the relative positions of the output bits of the storage device, the relative bit sizes of the ADC and the DAC, the array readout rate, the array size, and the gain setting of the amplifier. The time constant may be made longer by reduced sampling into the storage device; for example the ADC output could be fed into the adder only on alternate array readout cycles or even less frequently. By choosing an appropriate time constant, this invention may be used to screen out unwanted low frequency signals whilst allowing wanted higher frequency signals to pass. For example a time constant of 100 seconds would allow signals above 0.1 Hz to pass without attenuation, which would be suitable for a person detector, whereas a time constant of 10 seconds would allow signals above 1 Hz to pass, which would be adequate for a flame detector.

Thus is demonstrated a technique for dynamically correcting the offset voltages of a series of signals read from a detector array. The same principle may be applied to bring any string of disparate voltages to a common level over a period of time. This technique brings the signal levels to a pre-determined voltage, and will correct any slow variations in the incoming signal while allowing any higher frequency signals to pass without attenuation.

Figure 5:
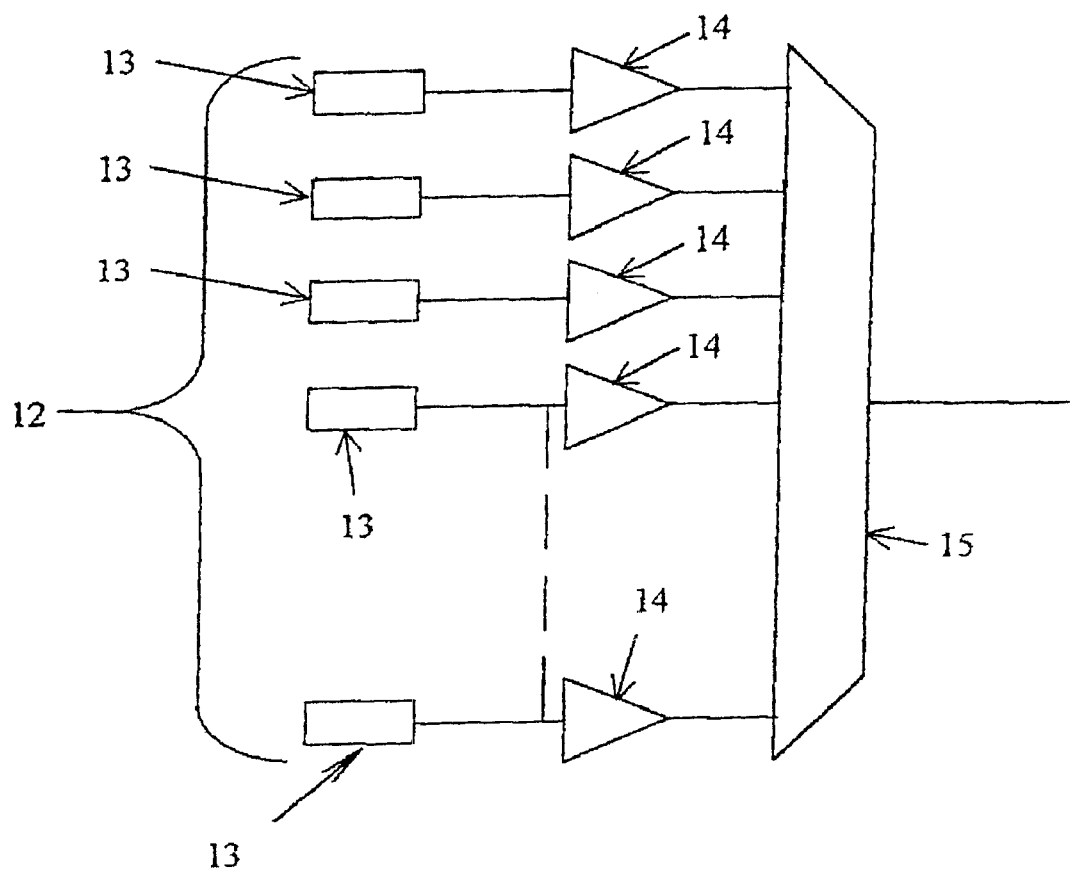
FIG. 5 is a schematic diagram of an array of detector elements and an associated multiplexer typical of the type that would supply the output illustrated in FIG. 1.

FIG. 5 illustrates the sort of circuitry that would supply the input signals shown in FIG. 1. The figure shows a sensor 12 comparing an array of detector elements 13. Signals from the elements 13 would typically be amplified by amplifiers 14 supplying their outputs to multiplexer 15. The output of multiplexer 15 would be supplied to the input point 1 of the circuit of FIG. 2.

| Cycle | Output voltage | Stored voltage | DAC output |
| --- | --- | --- | --- |
| 0 | 32 | 0 | 0 |
| 1 | 32 | 32 | 1 |
| 2 | 30 | 62 | 1 |
| 3 | 30 | 92 | 1 |
| 4 | 30 | 122 | 2 |
| 5 | 28 | 150 | 2 |
| 6 | 28 | 178 | 3 |
| 7 | 26 | 204 | 3 |
| 8 | 26 | 230 | 4 |
| 9 | 24 | 254 | 4 |
| 10 | 24 | 278 | 4 |
| 11 | 24 | 302 | 5 |
| 12 | 22 | 324 | 5 |
| 13 | 22 | 346 | 5 |
| 14 | 22 | 368 | 6 |
| 15 | 20 | 388 | 6 |
| 16 | 20 | 408 | 6 |
| 17 | 20 | 428 | 7 |
| 18 | 18 | 446 | 7 |
| 19 | 18 | 464 | 7 |
| 20 | 18 | 482 | 8 |
| 21 | 16 | 498 | 8 |
| 22 | 16 | 514 | 8 |
| 23 | 16 | 530 | 8 |
| 24 | 16 | 546 | 9 |
| 25 | 14 | 560 | 9 |
| 26 | 14 | 574 | 9 |
| 27 | 14 | 588 | 9 |
| 28 | 14 | 602 | 9 |
| 29 | 14 | 616 | 10 |
| 30 | 12 | 628 | 10 |
| 31 | 12 | 640 | 10 |
| 32 | 12 | 652 | 10 |
| 33 | 12 | 664 | 10 |
| 34 | 12 | 676 | 11 |
| 35 | 10 | 686 | 11 |
| 36 | 10 | 696 | 11 |
| 37 | 10 | 706 | 11 |
| 38 | 10 | 716 | 11 |
| 39 | 10 | 726 | 11 |
| 40 | 10 | 736 | 12 |
| 41 | 8 | 744 | 12 |
| 42 | 8 | 752 | 12 |
| 43 | 8 | 760 | 12 |
| 44 | 8 | 768 | 12 |
| 45 | 8 | 776 | 12 |
| 46 | 8 | 784 | 12 |
| 47 | 8 | 792 | 12 |
| 48 | 8 | 800 | 13 |
| 49 | 6 | 806 | 13 |
| 50 | 6 | 812 | 13 |
| 51 | 6 | 818 | 13 |
| 52 | 6 | 824 | 13 |

-continued

| Cycle | Output voltage | Stored voltage | DAC output |
|---|---|---|---|
| 53 | 6 | 830 | 13 |
| 54 | 6 | 836 | 13 |
| 55 | 6 | 842 | 13 |
| 56 | 6 | 848 | 13 |
| 57 | 6 | 854 | 13 |
| 58 | 6 | 860 | 13 |
| 59 | 6 | 866 | 14 |
| 60 | 4 | 870 | 14 |
| 61 | 4 | 874 | 14 |
| 62 | 4 | 878 | 14 |
| 63 | 4 | 882 | 14 |
| 64 | 4 | 886 | 14 |
| 65 | 4 | 890 | 14 |
| 66 | 4 | 894 | 14 |
| 67 | 4 | 898 | 14 |
| 68 | 4 | 902 | 14 |
| 69 | 4 | 906 | 14 |
| 70 | 4 | 910 | 14 |
| 71 | 4 | 914 | 14 |
| 72 | 4 | 918 | 14 |
| 73 | 4 | 922 | 14 |
| 74 | 4 | 926 | 14 |
| 75 | 4 | 930 | 15 |
| 76 | 2 | 932 | 15 |
| 77 | 2 | 934 | 15 |
| 78 | 2 | 936 | 15 |
| 79 | 2 | 938 | 15 |
| 80 | 2 | 940 | 15 |
| 81 | 2 | 942 | 15 |
| 82 | 2 | 944 | 15 |
| 83 | 2 | 946 | 15 |
| 84 | 2 | 948 | 15 |
| 85 | 2 | 950 | 15 |
| 86 | 2 | 952 | 15 |
| 87 | 2 | 954 | 15 |
| 88 | 2 | 956 | 15 |
| 89 | 2 | 958 | 15 |
| 90 | 2 | 960 | 15 |
| 91 | 2 | 962 | 15 |
| 92 | 2 | 964 | 15 |
| 93 | 2 | 966 | 15 |
| 94 | 2 | 968 | 15 |
| 95 | 2 | 970 | 15 |
| 96 | 2 | 972 | 15 |
| 97 | 2 | 974 | 15 |
| 98 | 2 | 976 | 15 |
| 99 | 2 | 978 | 15 |
| 100 | 2 | 980 | 15 |
| 101 | 2 | 982 | 15 |
| 102 | 2 | 984 | 15 |
| 103 | 2 | 986 | 15 |
| 104 | 2 | 988 | 15 |
| 105 | 2 | 990 | 15 |
| 106 | 2 | 992 | 16 |
| 107 | 0 | 992 | 16 |
| 108 | 0 | 992 | 16 |
| 109 | 0 | 992 | 16 |
| 110 | 0 | 992 | 16 |

What is claimed is:

1. A sensor comprising an array of detector elements and readout means for deriving from the elements a multiplexed stream of analogue voltage signals signal relating to a detected phenomenon, the sensor having offset correction means operative to compensate for differences between the d.c. or low frequency voltage signals derived from the elements and a predetermined voltage, wherein the voltage signals are applied as input voltages to the offset correction means and for each element the offset correction means produces an output voltage that is derived from the input voltage for that element and is continuously modified by subtracting from the input voltage a correcting voltage that is derived from an ongoing cumulative addition of a proportion of the difference between the output voltage for the said element and the predetermined voltage.

2. A sensor as claimed in claim 1 in which an amplification means is included between the input and the output of the offset correction means to provide said output voltages.

3. A sensor as claimed in claim 2 in which the offset correction means receives analogue signals from said readout means and includes an analogue to digital converter for converting said output voltages to digital signals, a storage device for storing a number corresponding to each detector element wherein the numbers are incremented or decremented in proportion to the positive or negative difference between the output voltage for the corresponding detector element and the predetermined voltage, and a digital to analogue converter, which converts a proportion of each stored number to analogue values, these analogue values providing the correcting voltages for said amplifier.

4. A sensor as claimed in claim 1 in which the detector array is an array of infrared detector elements.

5. A sensor as claimed in claim 4 in which the elements are pyroelectric detector elements.

6. A sensor as claimed in claim 3 in which the difference between the output voltage and the predetermined voltage decays exponentially with a time constant determined by the relative positions of the output bits of the storage device, the relative bit sizes of the analogue to digital and digital to analogue converters, the array readout rate, the array size and the gain setting of the amplifier.

7. A method of processing multiplexed signals from a sensor comprising an array of detector elements to compensate for differences between d.c. or low frequency voltage signals derived from those elements and a predetermined voltage, the method comprising subtracting a stored correcting voltage from the voltage signal for each element and deriving an output voltage for each element based on the subtraction, the correcting voltage for each element being derived by calculating the difference between the output voltage for each element and the predetermined voltage and adding a proportion of that difference to any previously stored correcting voltage for that element.

* * * * *

UNITED STATES PATENT AND TRADEMARK OFFICE
CERTIFICATE OF CORRECTION

PATENT NO. : 6,693,279 B2
DATED : February 17, 2004
INVENTOR(S) : Porter et al.

It is certified that error appears in the above-identified patent and that said Letters Patent is hereby corrected as shown below:

Column 6,
Lines 4-5, please delete "signal relating to a detected phenomenon"

Signed and Sealed this

Seventeenth Day of August, 2004

JON W. DUDAS
*Acting Director of the United States Patent and Trademark Office*